US006514381B1

(12) United States Patent
Stotz

(10) Patent No.: US 6,514,381 B1
(45) Date of Patent: Feb. 4, 2003

(54) METHOD AND APPARATUS FOR CONTINUOUS MECHANICAL THICKENING OF SLURRY

(76) Inventor: Wolf Gunter Stotz, Federburgstr. 50, Ravensburg (DE), D-88214

( * ) Notice: Subject to any disclaimer, the term of this patent is extended or adjusted under 35 U.S.C. 154(b) by 0 days.

(21) Appl. No.: 09/600,170

(22) PCT Filed: Feb. 10, 1999

(86) PCT No.: PCT/DE99/00359

§ 371 (c)(1), (2), (4) Date: Dec. 27, 2000

(87) PCT Pub. No.: WO99/40994

PCT Pub. Date: Aug. 19, 1999

(30) Foreign Application Priority Data

Dec. 2, 1998 (DE) ........................................ 198 05 593

(51) Int. Cl.[7] ............................ B30B 9/24; B01D 33/04

(52) U.S. Cl. ...................... 162/56; 162/358.1; 162/396; 210/384; 210/400; 210/401

(58) Field of Search ......................... 162/56, 60, 358.1, 162/396, 404; 210/400, 401, 350, 783, 384; 100/118

(56) References Cited

U.S. PATENT DOCUMENTS

| | | | | |
|---|---|---|---|---|
| 4,172,416 A | * | 10/1979 | Hadansson | 100/118 |
| 4,348,290 A | * | 9/1982 | Schipper | 210/783 |
| 4,501,040 A | * | 2/1985 | Biondetti et al. | 8/156 |
| 4,686,005 A | * | 8/1987 | Biondetti et al. | 162/60 |
| 4,851,119 A | * | 7/1989 | Bergloff et al. | 210/400 |
| 4,861,495 A | * | 8/1989 | Pietzsch | 210/739 |
| 4,906,369 A | * | 3/1990 | Bahr | 210/297 |

FOREIGN PATENT DOCUMENTS

| | | | |
|---|---|---|---|
| CH | 644414 | * | 7/1984 |
| DE | 9203395 | * | 5/1992 |
| DE | 4216968 | * | 1/1994 |
| EP | 0043599 | * | 1/1982 |
| EP | 0283870 | * | 9/1988 |

* cited by examiner

*Primary Examiner*—Dean T. Nguyen
(74) *Attorney, Agent, or Firm*—Howrey Simon Arnold & White, LLP

(57) ABSTRACT

Methods and corresponding devices are set forth for the continuous mechanical dewatering of aqueous suspensions or elutriations, particularly of waste-paper suspensions or slurries, between an endless mesh band and an endless compression surface having a closed, smooth surface and running in the direction of operation. The suspension cake to be dewatered is compressed between the mesh band and the compression surface. The requisite pressure is achieved by wrapping the mesh band around the cylindrical compression surface under longitudinal tension, whereby the expelled water is removed from the suspension cake by means of the mesh band. Devices are provided which both increase the operational duration of the dewatering pressure of the existing mesh band on the suspension cake, and at the same time increase the pressure substantially, without obstructing the runoff of the pressed-out water. The method of the invention increases the compression pressure from about 1 bar (heretofore) to a pressure of, e.g., up to 100 bars, and also permits integration into existing dewatering processes in order to increase the solid matter content, without thereby substantially increasing the equipment space or the operational complexity.

19 Claims, 8 Drawing Sheets

METHOD AND APPARATUS FOR CONTINUOUS MECHANICAL THICKENING OF SLURRY

BACKGROUND AND SUMMARY OF THE INVENTION

The invention relates to a method and corresponding devices for the continuous mechanical dewatering of aqueous suspensions or elutriations, particularly waste paper suspensions or slurries, between an endless mesh band and an endless compression surface exposing one closed, smooth surface and moving in the direction of operation. With this arrangement, the suspension cake to be dewatered is compressed between the mesh band and the compression surface. The requisite pressing power is achieved by wrapping the mesh band around the cylindrical compression surface under longitudinal tension during the dewatering process, whereby the water that is pressed out is removed from the suspension cake by use of the mesh band.

This thickener is also suitable for integration into existing dewatering processes with the goal of increasing the consistency of solid matter, without additionally increasing substantially the building space or operational complexity.

One of the heretofore known processes, e.g. the "Angle Press" of Bellmer from 1972, drives the suspension cake between two mesh bands; this has the advantage that the cake can be dewatered on two sides, while this sandwich is led in a meandering fashion around guiding rollers, resulting in the removal of expelled water from the roller through the mesh band looped around it, which is in the meantime outwardly disposed. The diameter of the guiding roller can also be reduced in the course of the loops, which increases the pressure. However, it proves to be an aggravating disadvantage that the water that remains in the meshes of both mesh bands due to adhesive force flows back into the cake after leaving the compression region, because the adhesive force of the suspension due to the finer fiber and particle sizes is stronger, and thus causes reverse suction.

However, the guiding roller diameters cannot be arbitrarily reduced, because the strength and deflection of the guiding rollers prohibits this.

Another possibility for increasing the compression lies in raising the longitudinal tension of the mesh band; here also the strength and deflection of the guiding rollers, as well as the strength of the mesh band itself, place limits on the increase of the solid matter proportion after the pressing.

In practice, the mesh band tensions are on the order of magnitude of 10 N/mr, seldom up to 30 N/mm, which, with a small roller diameter of, e.g., 200 mm, results in a pressure of about 1 bar, seldom 2 bars.

However, neither possibility prevents the rewetting due to the water in the mesh.

A second process uses only a single mesh band (Swiss patent CH 644414, "Variosplit"), which in part surrounds a smooth roller. The advantage lies in the rewetting of the cake on only one side and the simpler implementation with just one band. However it is disadvantageous that the cake can be dewatered only on this one roller, i.e. only a single time and only on one side, so that the resulting dryness proportion is not optimal. Moreover, the dewatered cake thickness is limited also because the water on the side by the roller must take a path through the entire cake thickness to the mesh. This can be somewhat compensated for, however, by a slower operation of the press.

An optimal result is thus not possible: final dryness proportion and mass flow throughput conflict with one another.

The chamber filter press is used as a third process, which uses not a continuous but a batch-wise operation; the involved filling and emptying procedure conflicts with the lengthy duration of operation and the high pressure. In addition, centrifuges (decanters) are set up for the removal of water. These two processes have nothing to do with this patent idea.

Although not belonging to the problem area of this invention, still for the sake of completeness the pressing of water out of, e.g., paper or cardboard sheets, is mentioned:

Fundamental differences in the subject matter of this invention are found in that, with paper, the quality of the sheet to be dewatered must be considered; i.e. that the incoming sheet is very homogeneous, that the pressing is carried out with felts that are insensitive to marking, that no crushing of the sheet can take place, i.e. displacement of the fibers, that the water that is pressed out may not move against the running direction of the paper sheet, because otherwise the paper sheet will be destroyed, and that all in all the quality, i.e. the homogeneity of the dewatered paper sheet, must be guaranteed.

Paper machine felts, which with their fine hair fleece provide for mark-free homogeneous pressing, are not used in the present patent idea. On the one hand, they can cause dirtiness much more easily, and on the other hand, uniform mark-free pressing is not at all necessary with the current invention; on the contrary, a marked, i.e. nonhomogeneous pressing is desired, because this will generate a certain kneading action, which helps a better water flow out of the cake. Moreover, with the current invention it is not desired that the cake form a stable sheet after the thickening. With the idea of the patent, a destruction of the sheet structure is inter alia intended through the intentional differential speed between the mesh band and the compression surface on the two sides of the cake and/or through the coarse structure of the additional water-permeable bands, in order to clear paths for the water during the squeezing out procedure for easier outflow, and in order to achieve a crumbling after the thickening.

In addition, suspensions with paper and cardboard sheets are not brought from a fluid phase to a consistency of over about 25% on the same mesh band, which is accomplished with this invention.

A goal of the invention is to avoid the disadvantages of the techniques that have been employed until now, in particular to combine the advantages of known apparatus, i.e. to increase the effective pressures on the suspension cake clearly and long enough with minimal rehydration, and indeed in a continuous throughput operation.

This problem is solved by the invention by providing fittings that both increase the effective duration of the pressure (dewatering pressure) of the existing mesh band on the suspension cake, and at the same time increase the pressure considerably, without obstructing the outflow of the expelled water. The method according to the invention increases the pressure from, until now, about 1 bar to a pressure of, e.g., up to 100 bars.

Economically interesting solutions result from this development:

By thickening waste paper suspensions, the invention can be directly attached to the washing process, i.e. the separation of fine materials from reusable fiber material by means of dewatering a thin-layer low-consistency suspension (<2%) with a higher working speed (>200 m/min.), whereby the mesh band used for this purpose is put to use with the guiding rollers for both steps. The transport of the partially dewatered suspension also goes from the washer to the thickener.

The thickening of slurries by means of the double-mesh press will lead to a lower water content of the mechanically dewatered cake, through the integration of the invention in the known process (ingoing consistency of <2% with an operating speed <10 m/min.). This is of high general economic benefit: high costs are incurred these days for the removal of the thickened slurry and for the then-necessary disposal space, drying or burning, respectively, since ⅔ to ¾ of the volume consists of water. Reducing the water content has a direct positive effect on these costs.

Advantageous arrangements of the patent idea should improve the efficiency and range of application. The application to not very uniformly distributed suspension cakes and the avoidance of rehydration during the separation of the already thickened cake and the first mesh band are given particular attention.

The claims specify that the pressure is increased by running several continuous bands on top of one another. The pressure is thereby correspondingly increased, though the band tensions remain in customary ranges.

The claims deal with different band constructions, which make possible the flowing through of expelled water. Thus, in the claim a band is claimed that holds no water in its holes, and accordingly also cannot allow return flow of such water.

The claims deal with the high inherent stiffness of the band, in order to bridge over unevennesses of the cake or to even out the pressure, which both rolls the cake and aids the outflow of the expelled water.

By the use of a compression shoe with hydrostatic or hydrodynamic lubrication, the sliding characteristics between the band and the sliding surface are likewise improved. The inherent stiffness of the band can be very high in the direction transverse to that in which the machine runs, as long as the longitudinal stiffness remains so low that the band can easily follow the contours of the rollers and the sliding surfaces.

The claims highlight alternatives wherein the expelled water can flow, in particular can be transported out of the compression region, without the pressing out process being hindered due to mangled amounts of material that could be sucked in.

The claim shows that the still unstable filter cake is subjected to increasing pressure, while several bands are run through after one another and, only as the last step, the high pressure of the compression shoe takes place.

The claims are directed to the prevention of the reverse flow of free water from the bands into the cakes by separating them from one another after exerting the maximum pressure, because this would deteriorate the achieved consistency of the cake. The claim operates on the premise that, given a rapid complete separation of all water-carrying bands (above all using a high operating speed), little time will remain for the water to be sucked back in.

The claim, intended primarily for slow operation, operates on the premise that the first mesh band actually remains on the cake a short while longer and its water can be returned to the cake, but further water-bearing bands take their water with them and do not rehydrate the band.

This is particularly assured when, as in the claim, the band that lies against the first mesh band carries scarcely any water with it. This effect becomes clear from the arrangement of the separation of the bands underneath the cake, where gravity prevents the reverse flow to the first mesh band.

If the rehydration due to the first mesh band itself is to be minimized, there are two possibilities:

One can select therefor a mesh web with small receiving volumes for the pressed water, and in particular this mesh is compressible under pressure, so that only a small amount of water sticks to it after leaving the pressure zone.

Or, according to the claim, one removes the water from the mesh after it leaves the pressure zone and before the mesh is lifted off of the suspension cake. This can be accomplished by tangentially spraying a flat stream of water onto the mesh, whereby the higher stream speed, with its kinetic energy, rips the water from the web mesh. The same thing can happen by blowing of a stream of air. However, these two methods are not very convenient, because the spraying water must be recovered. Therefore it is more sensible to use a suction pipe, which by means of a longitudinal member forms a gap with respect to the mesh, through which the suction air flows. In this case, the water is ripped out of the mesh, and is carried off with the suction air through the suction pipe.

The claims show variations in how the compression surface, against which the first mesh band compresses the suspension cake, can be designed. The claim shows a shoe drum with a radius of curvature that becomes progressively smaller, which is possible without differential speed or friction between the roller cylinder and the mesh band.

The claims involve a modified principle, wherein the compression surface in the pressure zone takes on a concave form (shoe cylinder) and presses against a round cylinder.

Although the fundamental principle of this invention is not necessarily bound to the fundamental spatial placement of the apparatus elements, in the embodiments of the claims; it is of great benefit if the round opposing cylinder is positioned underneath the pressure zone. In this case, the removal of the expelled water is easiest. This is particularly advantageous in the case of the lower speed of operation during the dewatering of the slurry, as in the claim. In addition, press-water can also run off against the rotational direction. It is best to try to lead the bands away after the pressing in a declining slope, so that no mesh water can flow back to the cake.

The claim deals with the possibility that the first mesh band is operated with a different speed relative to the compression surface, whereby the suspension cake is dislocated and torn open, which increases the overall surface and improves the outflow of water.

The inventive idea will be more specifically explained in the following, with the help of simplified and schematically represented example implementations, with reference to the drawings:

DETAILED DESCRIPTION OF THE INVENTION

Figure 1:
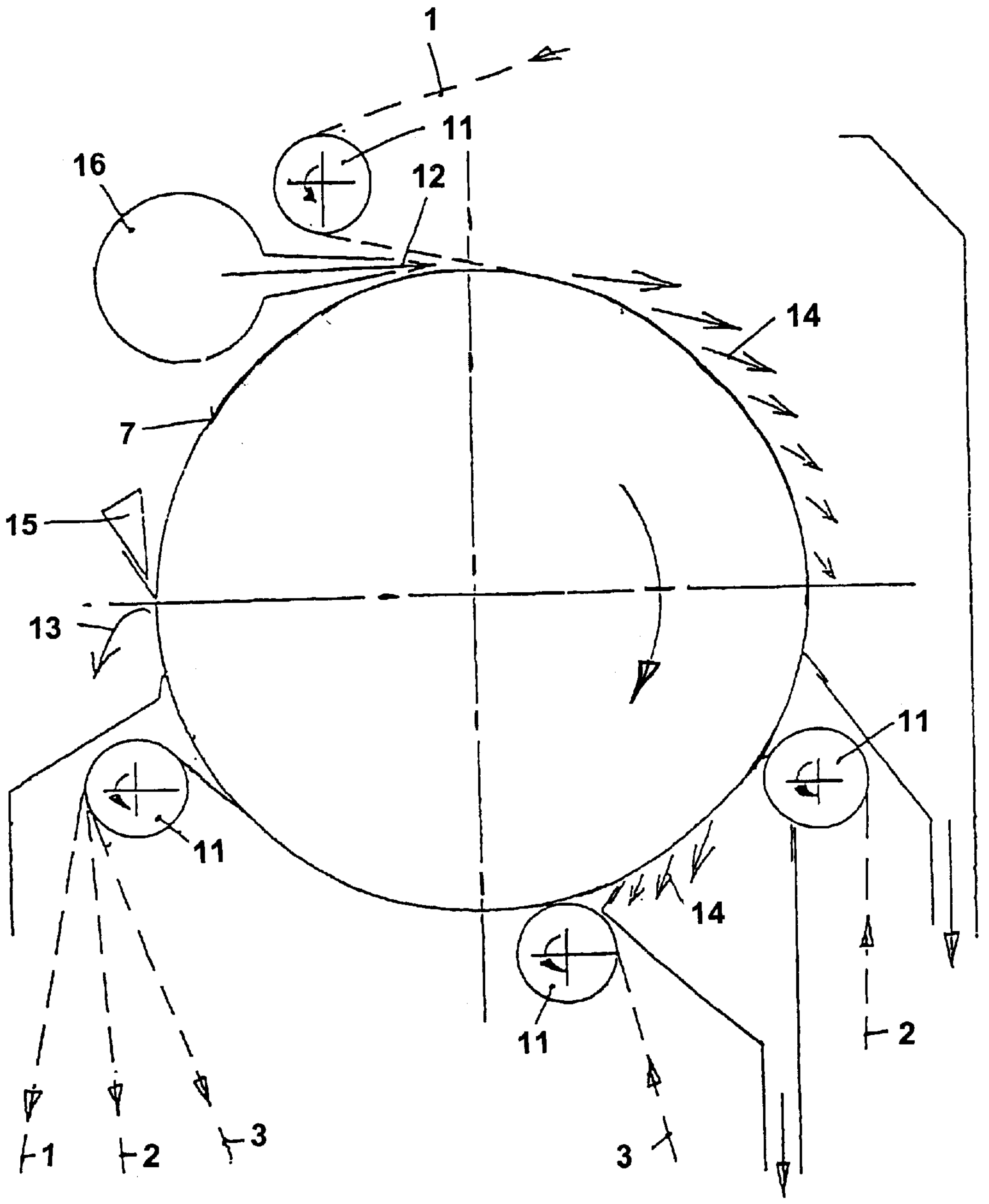
FIG. 1 shows the representation of a dewatering device using several bands and a roller as the compression surface.

In FIG. 1 a dewatering device is illustrated, in which the fiber suspension (12) is injected, by means of a distributor (16), between a roller constituting a compression surface (7) and a mesh band (1). Under the pressure of the mesh band (1) and the centrifugal force, the suspension (12) is subjected to a first dewatering, whereby fine materials are intentionally washed out of the suspension. The corresponding press-water (14) becomes ever lower in amount with increasing thickness. By the use of a second, encircling permeable band (2), the pressure is increased, so that further press-water (14) is squeezed out.

Now a third band (3), in this case an impermeable band, is likewise brought to the preceding bands by use of longitudinal tension, and the compression is increased yet again. It is now left open whether the expelled amount of water can still be taken up into the spaces in the first two bands (1, 2), or whether for this purpose a receiving space is available, e.g. channels or wells on the outer side of the third band (3). At the end of the three-stage pressing, all three bands (1, 2, 3) leave the compression surface (7) together, and first separate from one another on the band guide roller (11). Thereafter, in a manner not illustrated, all three bands are cleared of the water and cleaned. The thickened suspension cake (13) sticks to the compression surface (7) and is removed by a scraper (15). In accordance with the invention, the two bands (2, 3) are added to the known apparatus in order to decrease the water content of the suspension cake (13).

The illustrated apparatus runs at a speed of over 200 m/min.

Figure 2:
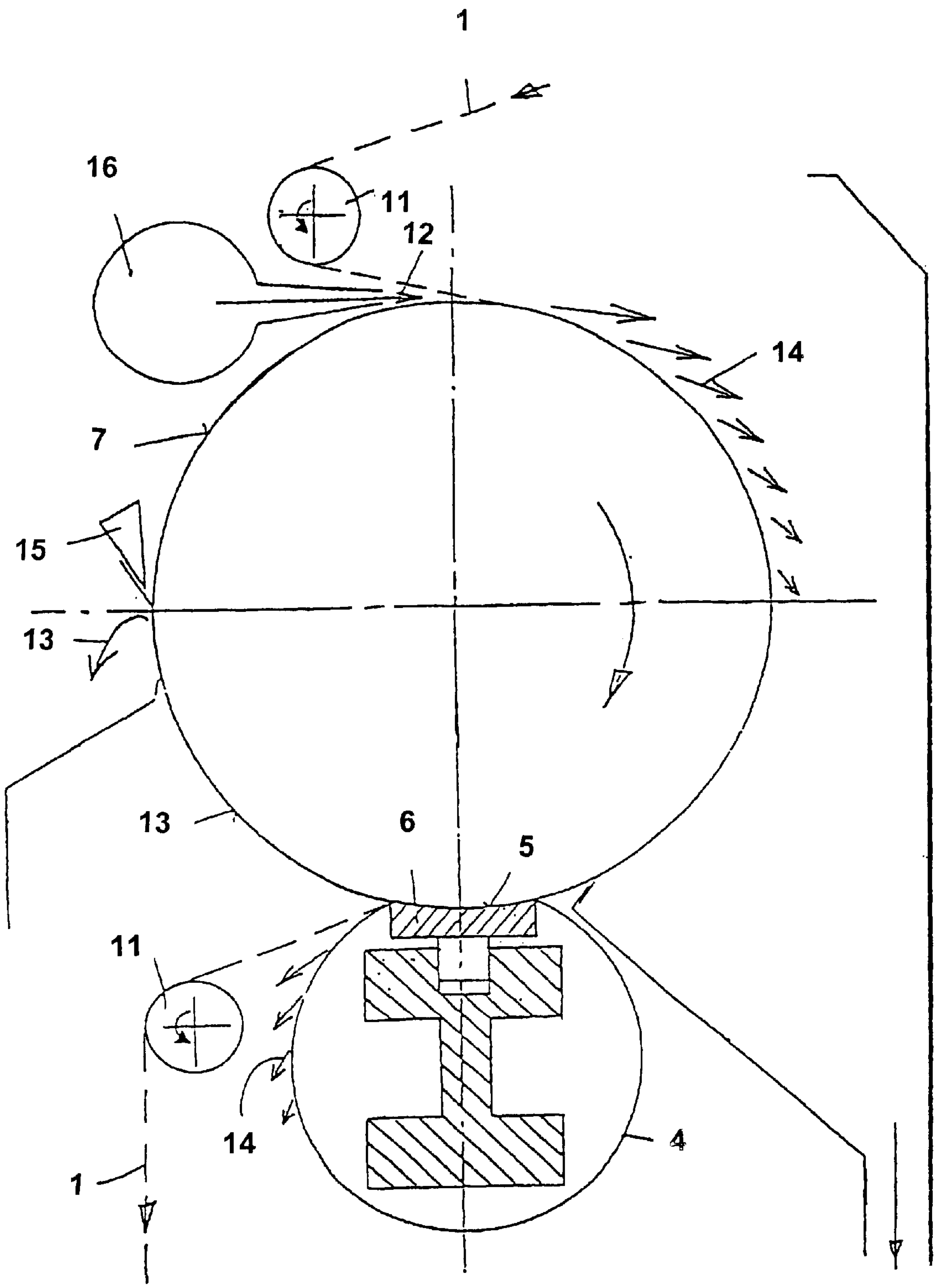
FIG. 2 shows the use of an impermeable band with a compression shoe.

In FIG. 2, the same dewatering apparatus is shown as in FIG. 1—here, however, instead of two additional bands, one additional band (3) is shown, which is pressed by a sliding surface (5) of a compression shoe (6). This band (3) has receiving spaces on its surface and thus, after leaving the pressure zone, it spins off the water that it has picked up. Both bands are simultaneously led away from the suspension cake, in order to minimize any rewetting.

Figure 3:
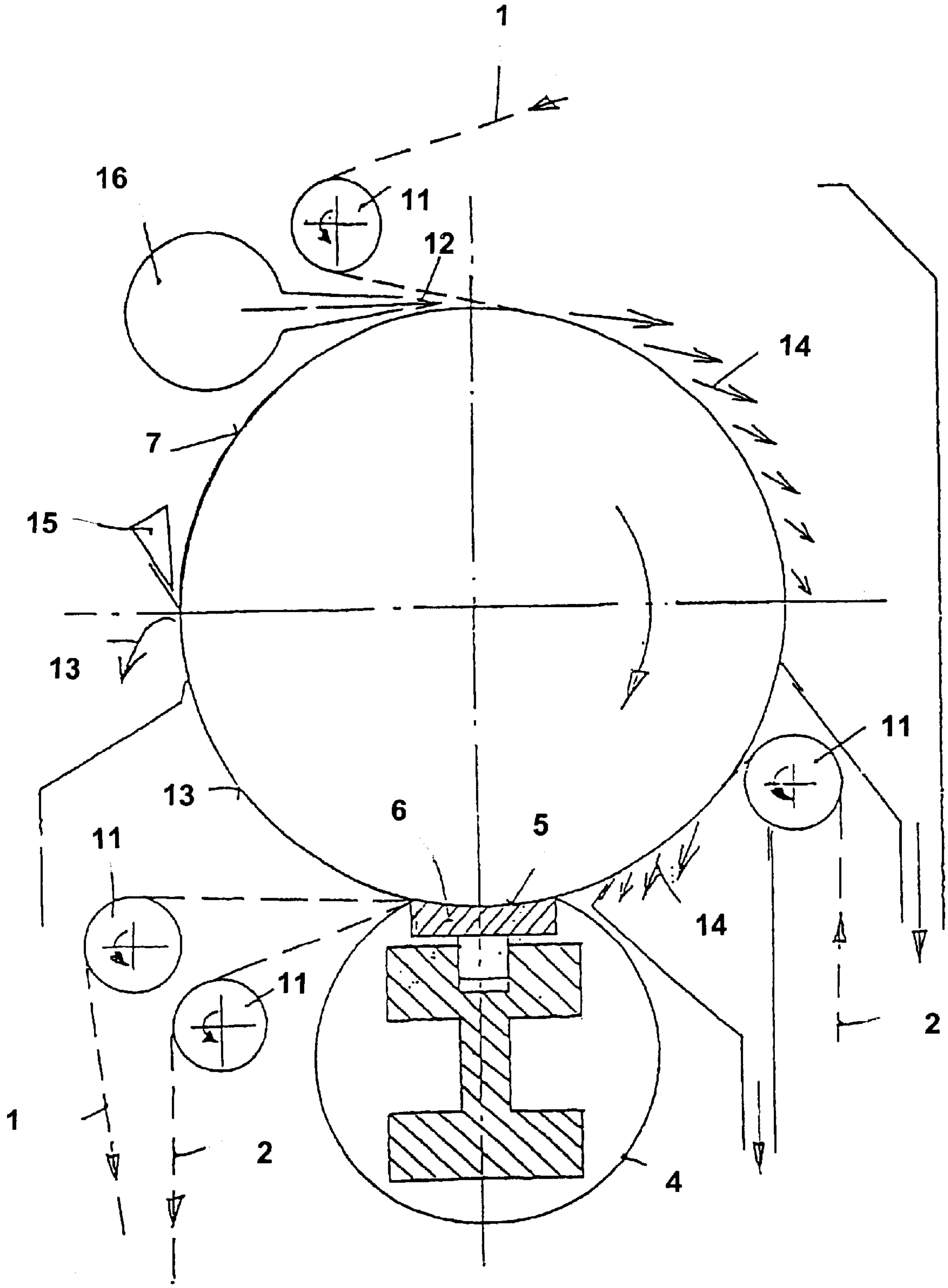
FIG. 3 shows the use of several bands and an impermeable band with a compression shoe.

FIG. 3 likewise deals with the same apparatus as in FIGS. 1 and 2. However, the thickening is achieved through a combination of FIGS. 1 and 2; that is, a second, permeable band (2) and a third, impermeable band (4) are provided, but the third band (4) is pressed using a sliding surface (5). This third band (4) in this case has no receiving spaces, and thus no press-water is spun off by this band. The three bands (1, 2, 4) are once again simultaneously led away from the cake (13), but each in its own direction.

Figure 4:
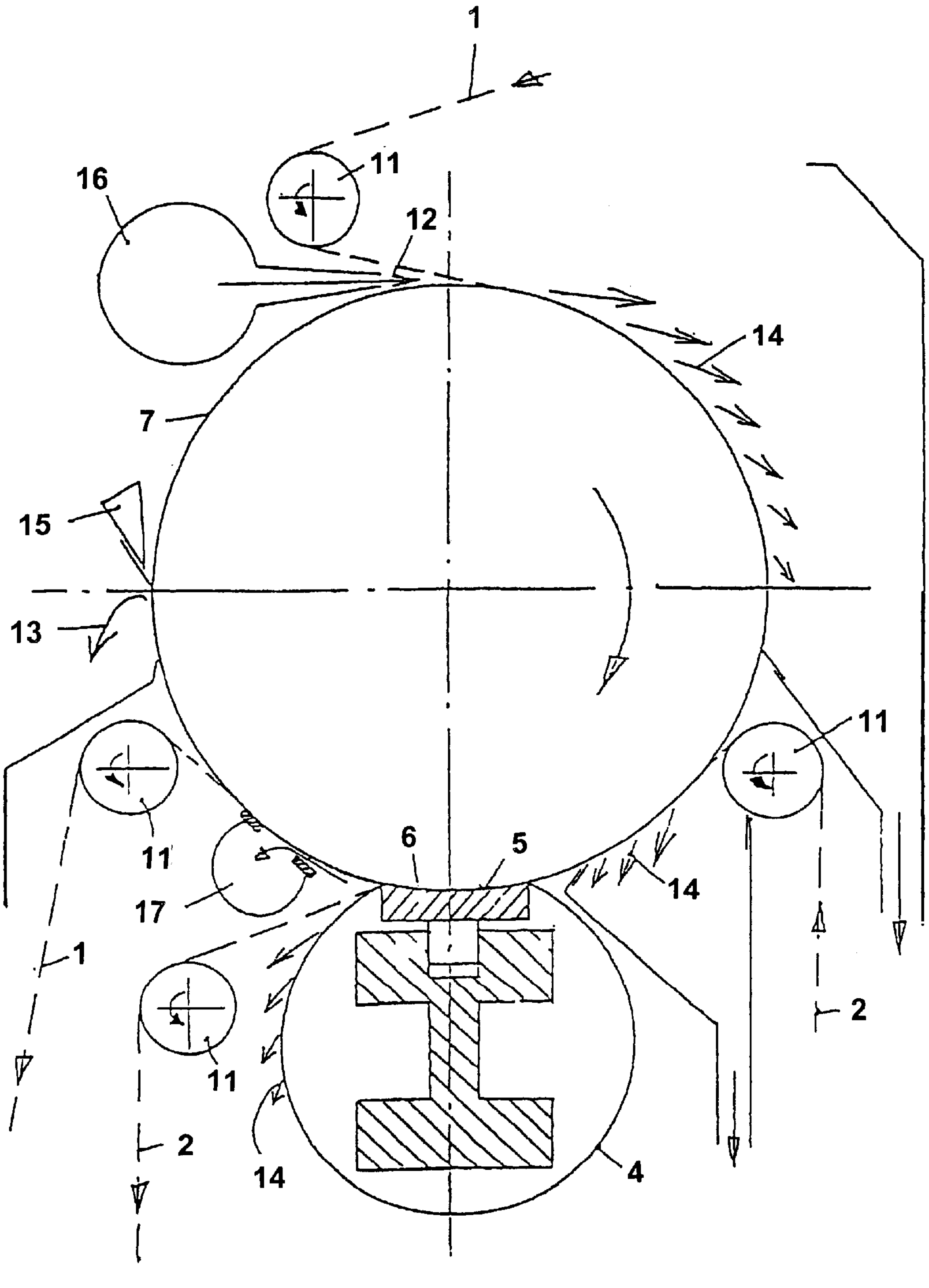
FIG. 4 shows FIG. 3, but where the first mesh band remains on the suspension cake even after the increased pressure.

FIG. 4 corresponds substantially to FIG. 3, but with the following differences: the third band (4) again has receiving spaces and spins off the water (14). In addition, the first mesh band is not led away from the cake like the other two bands (2, 4), but remains under longitudinal tension on the cake. In this distance, the mesh is sucked dry using a suction tube with one side positioned with a spacing relative to the mesh.

Figure 5:
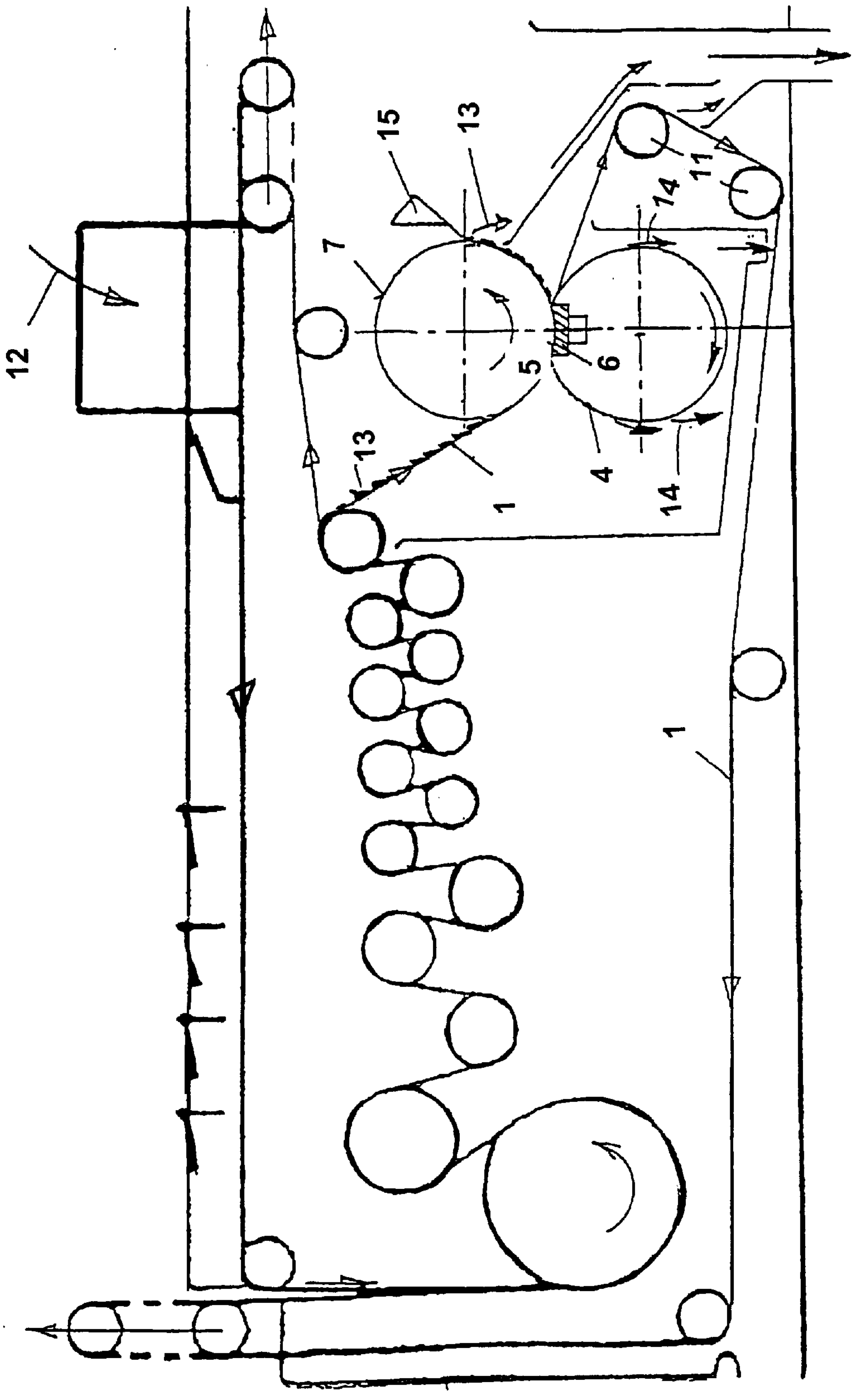
FIG. 5 shows the representation of a dewatering device for a slow dewatering speed and a thick suspension cake, with runoff of the pressed water counter to the operational direction.

FIG. 5 shows a very slowly running (under 10 m/min.) slurry-dewatering apparatus, which itself is provided with two mesh bands (1, 2) and a number of band guide rollers (11), in order to dewater the slurry at every turn, alternating on each side.

Here, the inventive apparatus is advantageously integrated immediately thereafter, using one of the two mesh bands (1). A smooth roller is provided as a compression surface (7), which is partially wrapped around by the existing mesh band (1). The second band is not used further, since according to the invention only one band is necessary. A third, impermeable band (4) and a compression shoe (6) with a sliding surface (5) now serve as a compression apparatus, in which the band (4) includes circumferential channels.

Using this apparatus it is possible to conduct the falling amounts of press-water (14) in or opposite to the direction of operation. The water remaining in the band (1) likewise does not flow back into the cake, because the band (1) is led away downwardly. The cake (13), clinging to the compression surface (7), is removed by the scraper (15).

Figure 6:
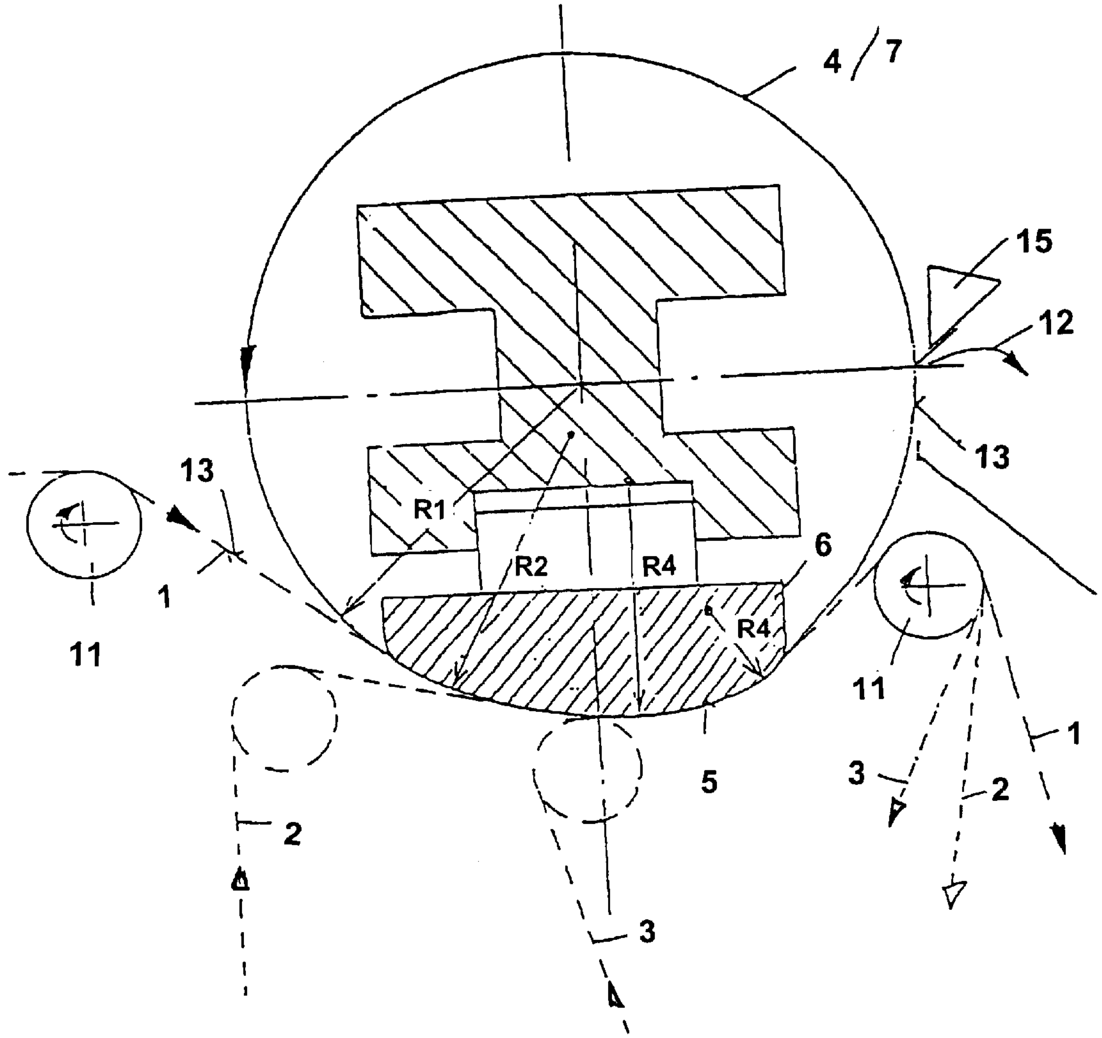
FIG. 6 shows the progressive dewatering through one or several bands using a diminishing radius of curvature of the smooth compression surface.

FIG. 6 illustrates a combination taken from FIGS. 1 and 5: the cake and the first mesh band are—similarly to FIG. 5—wrapped around the compression surface (7), which itself, however, does not comprise a round roller, but rather a smooth, impermeable band (4), which is guided by a compression shoe (6) with a sliding surface (5). A particular feature is that this sliding surface is provided with a progressively diminishing contour (R1–R4) in the direction of operation, whereby the pressure on the suspension cake steadily increases.

Illustrated as dotted lines are additional bands (2, 3), which may be added as in FIG. 1, in order to further increase the pressure.

Figure 7:
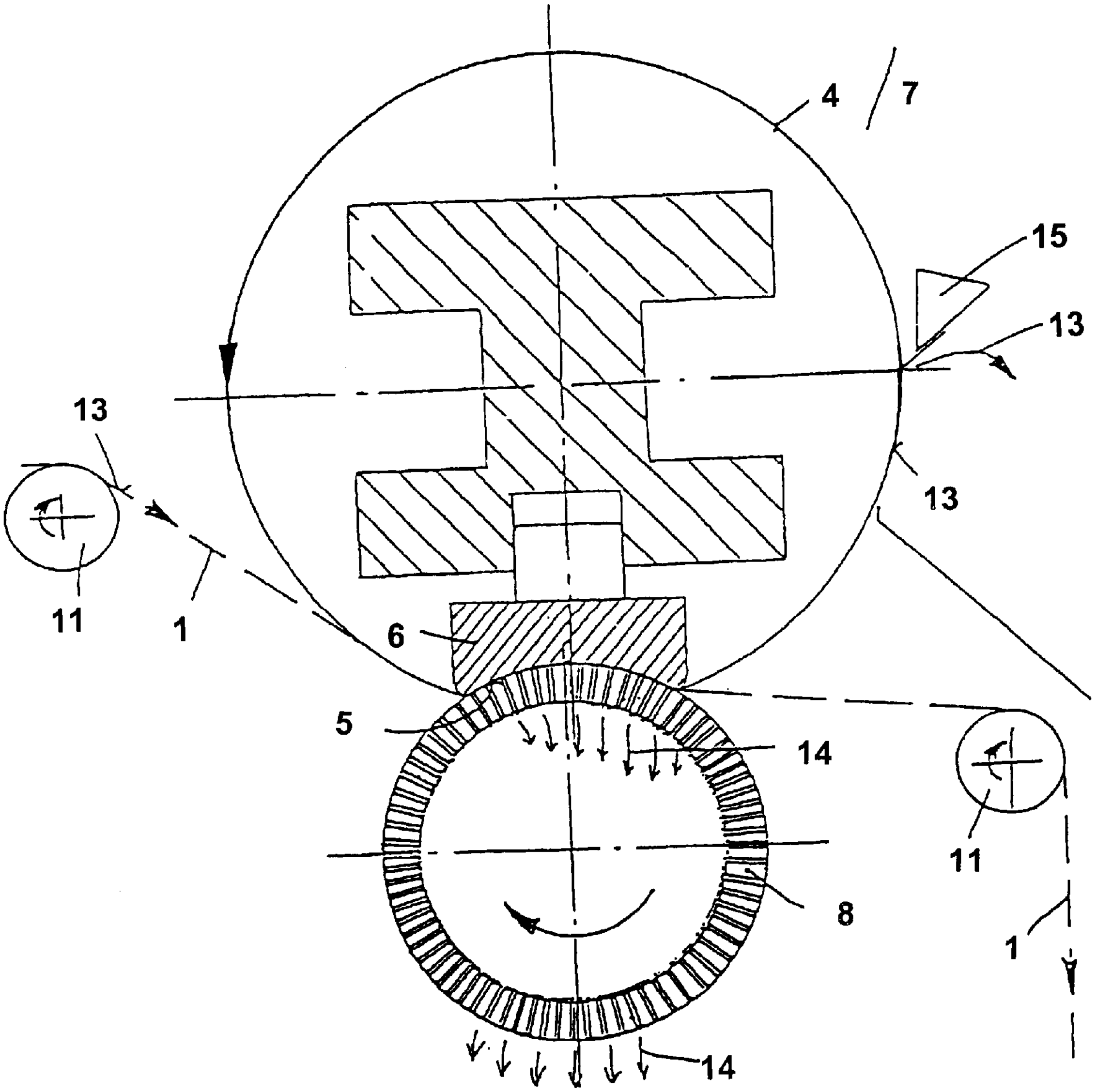
FIG. 7 shows the pressing using a perforated roller cylinder.

FIG. 7 likewise relates to the apparatus according to FIG. 5, and retains the guiding of the first mesh band shown there. The two "rollers" (4, 7) are simply interchanged, whereby the impermeable band with its compression shoe becomes the smooth compression surface (as in FIG. 6), though with a concave sliding surface (5), in order to correspond to the existing roller cylinder (8) as an opposing surface. The press-water can fly off radially through the bores provided in the roller cylinder (8).

Figure 8:
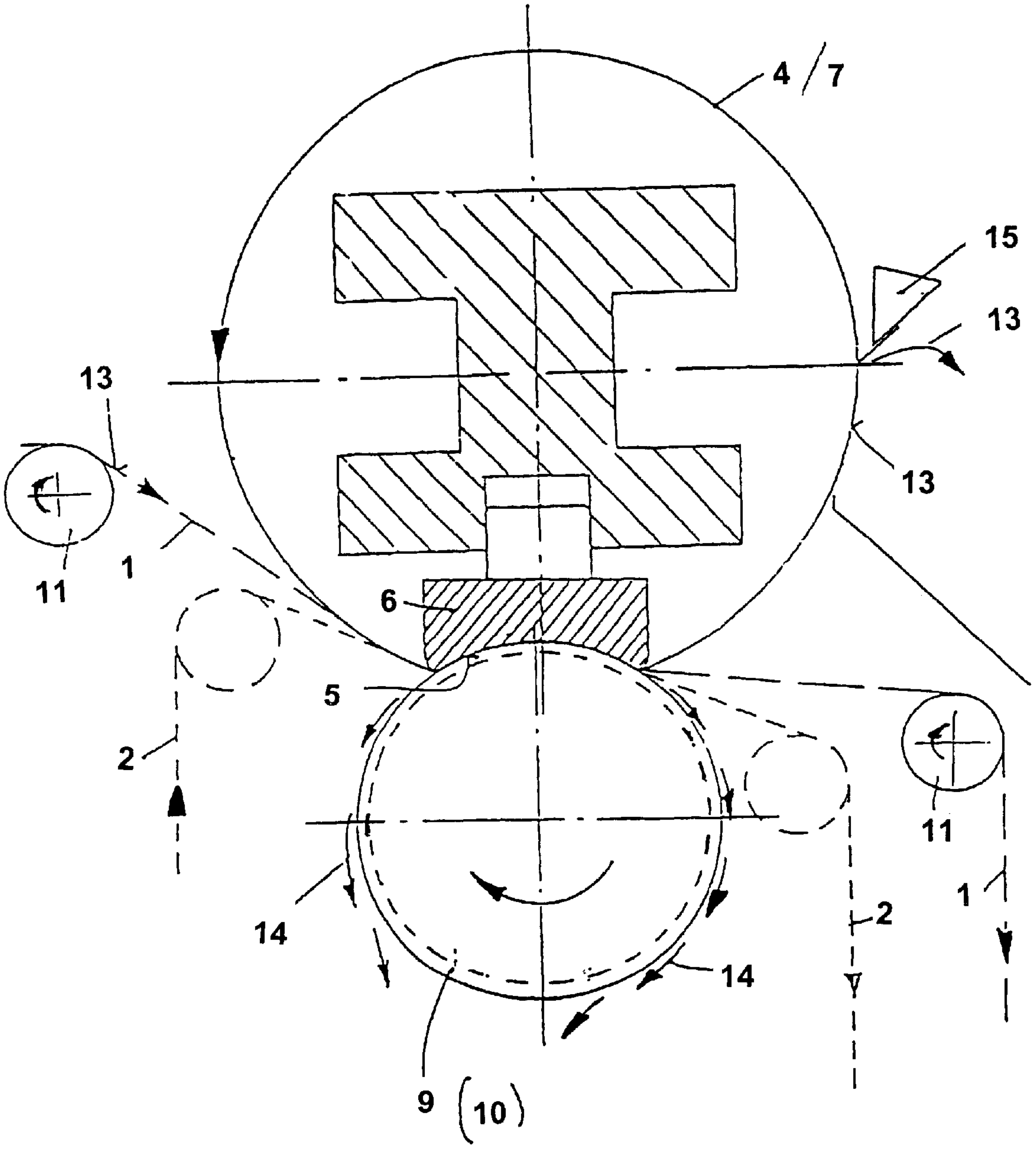
FIG. 8 shows, similar to FIG. 7, the pressing using a roller with circumferential channels.

In FIG. 8, in contrast to FIG. 7, the roller cylinder (8) is replaced by a solid roller with circumferential channels (9). Thus, the water can, as in FIG. 5, flow away tangentially in both directions.

This roller is also conceivable as a solid roller with wells on its surface (10).

A further band is also illustrated here in dotted fashion, in case the pressure on the band should be increased before it is compressed by the shoe (6).

What is claimed is:

1. A method for the continuous mechanical thickening of water-containing suspensions or slurries with the aid of an endless mesh band and an endless compression surface having a closed, smooth surface moving in the direction of operation, including the steps of:

compressing a suspension cake between the mesh band and the compression surface; and generating a pressure such that the mesh band wraps around the cylindrical compression surface under longitudinal tension during the dewatering process;

wherein at least a second endless band (2, 3) operates on the first mesh band (1) and a water impermeable third endless band (4) is pressed against the other bands (1, 2, 3) by way of a sliding surface (5), whereby the sliding surface (5) is formed on a compression shoe (6) corresponding to the opposing compression surface (7); and the second endless band (2) is a mesh band.

2. A method according to claim 1, wherein the sum of the longitudinal tensions of all additional bands (2, 3) corresponds to at least the longitudinal tension of the mesh band (1).

3. A method according to claim 1, wherein a water impermeable endless band (4) is pressed against the first mesh band (1) so as to increase the dehydration pressure on the suspension cake (13) to at least ten times the amount of the pressure produced by the mesh band itself.

4. A method according to claim 1, further including the step of pressing the third endless band (4) against the mesh band (1) by at least one sliding surface (5), whereby the contact pressure works against the compression shoe, corresponding to the extension of the shoe (6) in the direction of operation.

5. A method according to claim 4, wherein the contact pressure in the operational direction work-s substantially uniformly.

6. A method according to claim 4, wherein the contact pressure in the operational direction works substantially in an increasing fashion.

7. A method according to claim 1, further including the step of receiving the water (14) flowing out trough the first mesh band (1) by the second endless band (2).

8. A method according to claim 1, further including the step of receiving the water flowing out through the first mesh band (1) both through the second endless band (2) as well as through the third endless band (3, 4), by means of a plurality of wells or circumferential channels provided in the outer surface of the third endless band.

9. A method according to claim 1, further including the steps of: increasing the pressure on the suspension cake (13) in several steps, compressing at least one additional endless band (2) under longitudinal tension from without against the first mesh band (1), and, pressing a water-impermeable endless band (4) on the bands (1, 2, 3).

10. A method according to claim 1, further including the step of leading the bands away from the suspension cake (13) after reaching the maximum pressure, in order to prevent flowback of expelled water (14) from the bands (1, 2, 3, 4) into he suspension cake.

11. A method according to claim 1, farther including the step of maintaining the bands adjacent the suspension cake (13) after reaching the maximum pressure, in order to prevent the flowback of expelled water (13) from the bands (1, 2, 3, 4) into the suspension cake.

12. An apparatus according to claim 11, further including the steps of maintaining the first mesh band (1) adjacent the suspension cake (13) after leaving the zone of maximum pressure, such that its longitudinal tension still exerts dewatering pressure, thereby removing free water (14) from the web mesh, and introducing air (17) or water with a speed substantially different from the speed of the band, thereby tearing water (14) out of the web mesh, thereby inhibiting rehydration of the suspension cake (13).

13. An apparatus for the continuous mechanical dewatering of water-containing suspensions or slurries, including:

an first endless mesh band;

an endless compression surface having a closed, smooth surface moving in a direction of operation, whereby the suspension cake to be dewatered is compressed between the mesh band and the compression surface with the first endless mesh band wrapped around the cylindrical compression surface under longitudinal tension;

at least a second endless band (2, 3) positioned near the first mesh band (1); and a water impermeable third endless band (4) pressed against the other bands (1, 2, 3) by way of a sliding surface (5), whereby the sliding surface (5) is formed on a compression shoe (6) corresponding to an opposing compression surface (7); wherein the second endless band (2) is a mesh band.

14. An apparats according to claim 13, wherein the second endless band (2) comprises longitudinal and transverse fibers, positioned one over the other.

15. An apparatus according to claim 13, wherein the second endless band (2) comprises longitudinal and transverse fibers, whereby the transverse fibers (transverse to the operational direction) have a greater bending stiffness than the longitudinal fibers.

16. An apparatus according to claim 13, wherein the second endless band (2) has perforations, which permit the penetration of the expelled water.

17. An apparatus according to claim 13, wherein at least one of the second endless band and the third endless band includes receiving holes in its outer surface.

18. An apparatus according to claim 13, wherein at least one said second band (2, 3) has a sufficient inherent stiffness in the transverse direction to span unevennesses in the suspension cake.

19. An apparatus according to claim 13, wherein the third endless band (4) only in the compression zone is formed from at least one compression shoe (6) corresponding to the contour of the opposing compression surface, and in the rest of its operational track is substantially cylindrical, thickened on its edges, and guided by circuitous side tracks, and whereby the compression shoe (6) is supported on a carrier, which grips through the circuitous band and is positioned tightly against the side tracks and in rotationally firm in its seating (FIG. 2).

* * * * *

UNITED STATES PATENT AND TRADEMARK OFFICE

CERTIFICATE OF CORRECTION

PATENT NO. : 6,514,381 B1 
DATED : February 4, 2003
INVENTOR(S) : Wolf Gunter Stotz It is certified that error appears in the above-identified patent and that said Letters Patent is hereby corrected as shown below:

Title page,
Item [30], should read as follows:

-- [30] Foreign Application Priority Data

Feb. 12, 1998 (DE) ..................... 198 05 593 --

Signed and Sealed this

Twenty-eighth Day of September, 2004

JON W. DUDAS
*Director of the United States Patent and Trademark Office*